Figure 2:
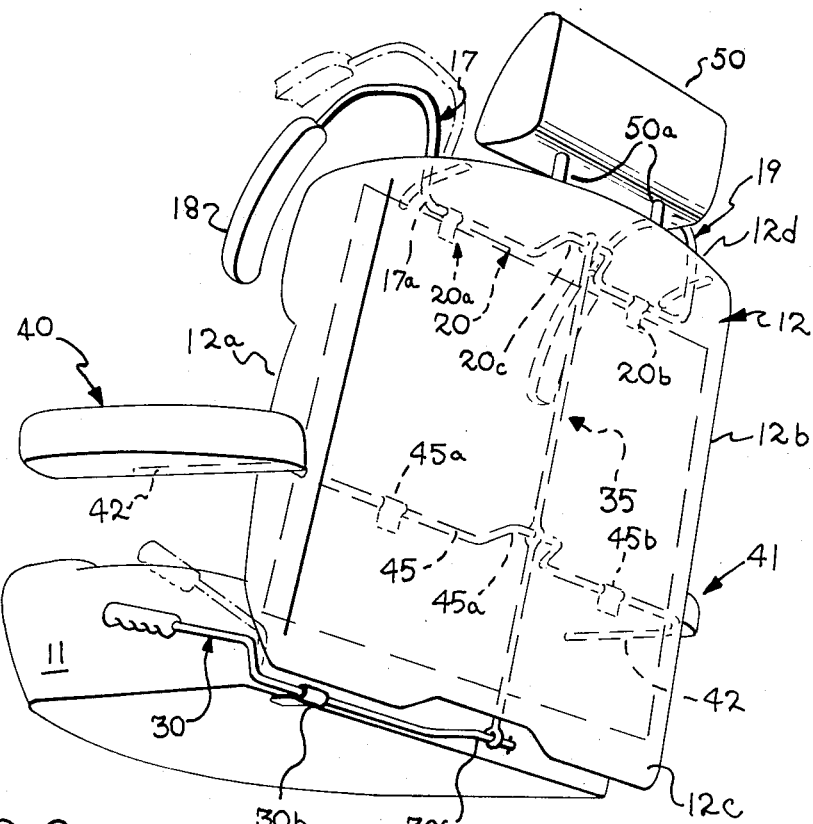

United States Patent [19]
Miller

[11] 3,713,694
[45] Jan. 30, 1973

[54] BODY RESTRAINING DEVICE FOR VEHICLE

[76] Inventor: Ralph A. Miller, 3832 Burton St., Toledo, Ohio 43612

[22] Filed: April 20, 1971

[21] Appl. No.: 135,576

[52] U.S. Cl............297/390, 280/150 SB, 297/216, 297/389
[51] Int. Cl............................................A62b 35/60
[58] Field of Search......297/390, 384, 417, 418, 216; 280/150 SB

[56] References Cited

UNITED STATES PATENTS

| | | | |
|---|---|---|---|
| 3,466,091 | 9/1969 | De Grusso | 297/390 |
| 3,262,716 | 7/1966 | Graham | 297/390 X |
| 3,376,064 | 4/1968 | Jackson | 297/410 |
| 2,873,122 | 2/1959 | Peras | 297/384 X |
| 3,165,357 | 1/1965 | Rudemann, Jr. | 297/384 |
| 3,474,471 | 10/1969 | Matibag | 297/417 X |

FOREIGN PATENTS OR APPLICATIONS

| | | | |
|---|---|---|---|
| 1,008,155 | 2/1952 | France | 297/390 |

Primary Examiner—James T. McCall
Attorney—Paul F. Stutz

[57] ABSTRACT

An improved seat construction for vehicle occupants which comprises, in addition to the usual horizontal platform and upstanding back support, a hand-operable lever arm and a pair of shoulder restraining members, the latter being connected via a connector rod to the former whereby shifting of the lever arm causes the shoulder restraining arms to shift between an operative occupant restraining position and an inoperative position, in which the occupant is not restrained, for convenience of ingress and egress of the occupant; said device including, in a preferred embodiment, a shiftable armrest arrangement.

8 Claims, 2 Drawing Figures

PATENTED JAN 30 1973 3,713,694

INVENTOR.
RALPH A. MILLER
BY
Paul F. Stutz
ATTORNEY

BODY RESTRAINING DEVICE FOR VEHICLE

The present invention relates to a safety restraining device for vehicles; most particularly, the passenger automobile. Over the years, a wide variety of devices have been proposed and designed for providing and effecting safety of limbs and body of automobile occupants. Certain of these have been, in fact, commercially adopted by the automobile manufacturers. At the present time, these include the aircraft-type seat belt and a similar diagonal shoulder belt arrangement. The seat belt comprises a fabric belt, one segment of which proceeds from an anchored position on one side of the occupant to approximate his midsection and the other segment of the belt proceeding from the other side of the passenger or operator, being anchored in the floor or the seat structure and proceeding approximately to the midsection, each end terminus therein including a buckling arrangement which embodies a quick release mechanism. Adjustable length provisions are included in one or the other buckles. The other device comprises one-half of the just-described seat belt device, with the other half of the belt being anchored along the roof-side wall margin of the vehicle and somewhat to the rear of the driver or passenger in the front seat. The latter, when buckled with the seat belt half, provides a belt restraint extending diagonally across one shoulder, the chest and the waist of the passenger or driver. Both of these similar arrangements operate to restrain and prevent forward movement of the occupant when the vehicle is stopped suddenly as by reason of a collision.

Another safety device which has found its way into commercial passenger vehicles is the vertically adjustable padded headrest. This device limits the rearward movement of the head, particularly when subjected to rear-end collisions, supposedly thereby reducing the so-called "whiplash" effect characterized usually by damage to the spine and/or the neck region of the occupant.

The seat belt arrangement above-described operates satisfactorily and is certainly desired as compared to a vehicle lacking any safety restraining device at all. It does, however, allow the upper portion of the occupant's torso, defined by the chest, shoulder and head, to continue forwardly by reason of inertia if the vehicle is subjected to a sudden stop as, for example, a collision with a stationary vehicle, obstruction or the like. In the case of the driver, this forward inertia movement of the upper torso can cause an impact between the body and, perhaps more dangerously, the head with the steering wheel or gear shift arrangement. In the case of the passenger, the forward movement can cause impact between the head of the passenger and the dashboard or impact between the head and the side windows and/or doors, including handles, etc. In the case of passengers seated in the rear of sedan vehicles, the forward motion can cause an impact between the head and the upstanding back portion of the front seat or impact between the head or upper torso regions of the rear-seated passengers with the side doors or side panels, including the side windows, window handles, door handles, armrests, etc.

The use of the other safety device consisting of the diagonal strap does, to an extent, overcome the difficulties of the simple seat belt arrangements (which proceed only across the pelvis region of the occupant) but is also subject to some drawbacks. Thus, the diagonal strap only tends to prevent forward movement with respect to the upper region which is in contact with the diagonal strap in its diagonal path across the torso. Thus, in the case of the driver occupant, the strap extends from the right hip region upwardly across the left shoulder region. Thus, upon sudden collision or stopping, the torso may be prevented somewhat from proceeding to the left and towards the door but it will tend to throw the driver to the right and forward. At the same time, in the case of the passenger in the right front seat, the strap passes from the left hip region diagonally upwardly across the chest and right shoulder whereupon movement to the right is inhibited to a degree but movement forward and to the left towards the driver is not materially impeded. Considering this movement, it can be seen that the driver and a passenger would tend to be thrown together towards the center and still possibly thrown against the dashboard and/or the steering wheel. It has additionally been determined that the diagonal-type restraining strap is frequently not used by occupants because of the somewhat trapped feeling imparted when the strap is in the fully engaged, snug body-contacting position. The driver's freedom of movement, when strapped in in this fashion, particularly tends to be considerably decreased which may result in a lessening of operator skill due to the limited movement.

Obviously, if any of the above factors tend to result in nonuse of the diagonal belt device, it might not as well be present and its effectiveness is completely lost.

It is accordingly an object of the present invention to provide an improved vehicle seat construction embodying features which serve to protect the occupants in a manner which is superior to any of those known heretofore.

It is also an object of the present invention to provide a construction as referred to hereinabove which is not possessed or haunted by the disadvantages referred to.

It is a significant object of the present invention to provide a vehicle seat including safety restraining features which function in the manner intended without actually touching the operator or the passenger.

It is still another object of the present invention to provide such an improved device which includes an auxiliary comfort arrangement in the nature of armrests.

It is likewise an object of the present invention to provide a cooperatively located combination of restraining and comfort devices which coact to improve the comfort of the driver and/or passenger while at the same time protecting the driver and/or passenger from random extreme movements either forwardly, sideways or rearwardly.

The foregoing objects, as well as other objects of the present invention, will become apparent to those skilled in the art from the following detailed description taken in conjunction with the annexed sheet of drawings on which there are presented, for purpose of illustration only, several combined embodiments of the present invention.

Figure 1:
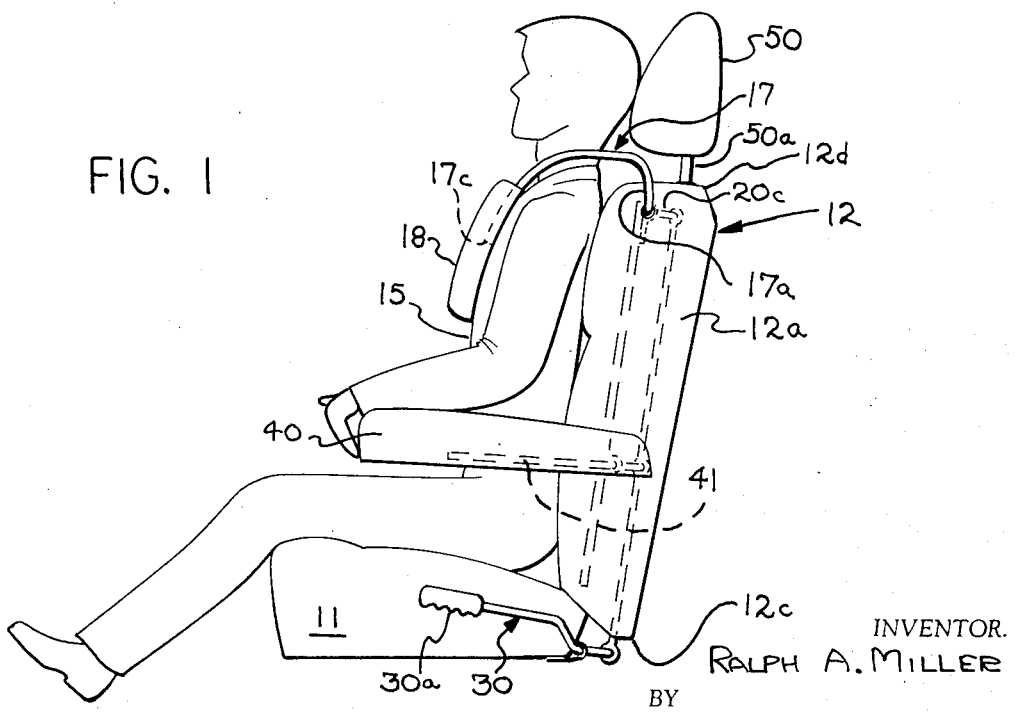

In the drawings:

FIG. 1 is a schematic side elevation view of an automobile seat modified to incorporate the improved passenger restraining and comfort devices of the present invention; and occupant being shown in outline; and FIG. 2 is a schematic three-quarter perspective rear view of an automobile seat embodying the improved shiftable safety devices of the present invention, with alternate positions thereof shown in dotted outline.

In its simplest embodiment, the present invention envisions a hand-actuable lever arm controllable of a pair of shoulder restraining members shiftable between a first position adapted to limit forward movement of an occupant situated in a vehicle seat and a second retracted position wherein occupant movement is not impeded whereby the occupant can easily move into or out of the seat.

Referring now more specifically to the drawings, the reference numeral 11 identifies a conventional upholstered seat of an automobile, while the reference numeral 12 identifies an upstanding upholstered back support similar to any conventional passenger car back support but modified to incorporate, interiorly thereof, features of novelty in accordance with the present invention. The vertical upstanding back support member 12 includes laterally spaced side edges 12a and 12b, a horizontal bottom edge 12c and an upper edge 12d. In FIG. 1, there is shown in side elevation outline an occupant 15 seated on the seat member 11 and with the back of the person resting against the vertical back support 12. Projecting upwardly from the top edge 12b of the back support 12 are a pair of spaced, inverted, generally U-shaped arms 17 and 19. The arms 17 and 19 are identically shaped and constructed. One end of the arm 17 connects as at 17a interiorly of the back support 12 with a horizontal crank arm 20 mounted as at 20a and 20b for limited rotation. The crank arm 20 has a central offset segment 20c for a purpose to be described. From the connection with the crank arm at 17a, the arm 17 proceeds vertically upwardly, thence horizontally (as best shown in FIG. 1) and thence curves gradually downwardly, terminating as at 17c, telescopically received within a shoulder pad member 18, having an axial bore for receiving the end terminus 17c and provided with suitable friction adjustment means for varying the position of the pad 18 with respect to the arm 17.

As can be seen in FIG. 1, the arm end 17c and the shoulder pad 18 are situated forwardly of the left shoulder and chest region of the occupant 15. Arm 19 is identically constructed and covers the right shoulder of the occupant. With the arms 17 and 19 and their associate pads located in the position shown in FIG. 1, the occupant's forward movement is limited by location of the arms 17 and 19, and specifically the pads. The arm 19, like the arm 17, terminates interiorly of the back 12 in a connection with crank arm 20 in a manner similar to that of the arm 17. As can be seen, arm 17 is capable of being shifted into the position shown in dotted outline in FIG. 1. This position is an upper position which locates the shoulder pads in a position of nonrestraint or nonengagement with respect to the shoulder region of the person 15 occupying the seat. The shifting movement of the arm 17 (and, of course, similarly the arm 19) is effected by the occupant through control of a lever arm 30 which extends alongside the side margin of the horizontal seat 11, as shown. The forward end of the lever arm is provided with a hand grip 30a. The arm 30 extends rearwardly to a region approximate the lower edge 12c of the back support, thence extends in a horizontal direction through a suitable bearing mount 30b secured along the lower edge 12c. The arm 30 extends to the center of the back support, terminating in an offset 30c situated vertically in the same plane and directly below the offset 20c of the crank arm 20. A vertical connector arm 35 connects the offset 20c and the offset 30c to effect movement of the shoulder restraining arms 17 and 19 responsive to movement of lever arm 30. The occupant of seat 11 simply grasps the hand hold segment 30a of the lever arm 30 and with his left hand moves it upwardly into the position shown in dotted outline in FIG. 2, whereupon the movement of the lever arm 30, and specifically the end 30a, upwardly will cause the offset end 30c to move downwardly, resulting in a downward movement of the connector arm 35 and, similarly, a downward movement of the offset 20c which translated through the arm 17 will cause the end extremity and pad 18 normally situated over the shoulders to move upwardly into the position shown in dotted outline in FIG. 2 where it no longer interferes with the normal ingress and egress of the occupant from the seat provided with the arrangement herein described. Any appropriate arrangement can be utilized to hold the lever arm, and correspondingly the shoulder restraining arms, in the upper or retracted position when manipulated into this position by the occupant leaving the vehicle. Thus, the connector arm 35 in its lower terminus and connecting with the offset 30c may include a spring device to hold the latter in the down position. Similarly, the bearing mounting 30b may include an internal spring arrangement or a recess and ridge arrangement tending to hold the lever arm 30 in a normally up position. This keeps the shoulder restraining arms in an up or out-of-the-way position so that the occupant can enter the vehicle and, once seated, can move the lever arm 30 into its down position, causing a consequent downward movement of the shoulder restraining arms 17 and 19 until they are positioned as shown generally in FIG. 1.

The pads may be telescopically adjusted on the shoulder arm extremities for individual comfort. Usually, the design of the shoulder restraining arms 17 and 19 is such that the shoulders of the occupant of the seat are not actually touched by the pads 18, avoiding the restrained or trapped feeling usually associated with the seat belt or the diagonal shoulder strap arrangement. Stated another way, occupant comfort is at a maximum, with relatively free movement being permitted. The spacing between the shoulder restraints may, in fact, allow freedom of movement of several inches forwardly. The spacing between the shoulder arm extremity and the body of the occupant may be varied by an appropriate selection of pad members 18 which may be fabricated of different thicknesses, with two or three sizes being available and readily telescoped onto the arm terminus 17c. A variety of known securement or fastening arrangements may be utilized for locating the pads on the arms.

In accordance with a further novel embodiment of the present invention, there is provided arm supports 40 and 41 which take the form of comfort pads mounted on an arm 42 which extends horizontally forward in the manner shown and connecting with a suitable crank arm 45 which is similar to the crank arm 20, specifically having an offset central portion 45c which connects with the connector arm 35 as shown. The crank arm 45 is suitably mounted as at 45a and 45b for limited rotational movement. It can be thus appreciated that the arm supports 40 and 41 are shiftable along with the shifting of the shoulder restraining arms responsive to movement of the lever arm 30. Although not shown, it will be appreciated from the earlier description of the movement of arms 17 and 19 that the arm members 42 shift into an upper, out-of-the-way position.

Further in accordance with the present invention, there is provided a rear head pad 50 which is mounted for vertical adjustment on a pair of support arms 50a which project upwardly from the top edge 12d of the back support 12. The headrest 50 is vertically adjustable in accordance with known techniques. The headrest 50 and the shoulder restraining arms 17 and 19 cooperate to provide the maximum of protection to the one occupying the seat furnished with these arrangements; the shoulder restraint preventing forward movement and the headrest 50 preventing backward movement. Although the headrest in and of itself is not new and does not of itself constitute a part of the present invention, the combination of the headrest and the shoulder restraint arms is a part of the present invention.

The arm supports 40, of course, are primarily a convenience item, although proper design thereof can accomplish the effect of limiting lateral movement of the occupier of the seat. Thus, it is envisioned that several different sized arm members 40 could be made available for purchase by auto owners, depending upon the size of the usual occupier of the seat, and telescoped onto the arm 41 in a readily releasable but secure manner.

The foregoing description of the shoulder restraint arms, connector members and the means for effecting movement of these items has been shown in an extremely simplified and schematic manner for ease of illustration and ease of understanding. Thus, it should be understood that considerable sophistication of design can be employed in translating the above-described concepts into an extremely attractive, yet utilitarian automobile seat.

It is, of course, envisioned that the presently conventional seat belt arrangement could be retained and, if so retained, would cooperate with the safety features and structures of the present invention, such as the shoulder restraints, hand restraints and armrests, as to provide effective passenger comfort as well as passenger safety by means of limited motion upon impact or collision.

It will be appreciated that various materials of construction may be employed in fabricating the several components making up the overall seat design described hereinabove. Thus, metals such as iron, steel, aluminum and various alloys as well as plastics and, in some cases, resilient plastics may be employed in the fabrication of the several components, depending upon and based upon a proper consideration of the properties of the several materials of construction and having in mind the stresses and forces to which the several components will be subjected. The selection of the proper materials, the dimensioning of the parts and the connecting together of the proper parts are, of course, considered well within the skill of the person ordinarily skilled in the art of automotive design.

The safety arrangements described hereinabove may be employed both in the forward and rear seats of passenger automobiles and may, of course, be employed in commercial vehicles such as trucks and the like.

It will be appreciated that minor changes as well as modifications may be made in the features of construction described hereinabove without departing from the spirit of the present invention as defined in the appended claims.

I claim:

1. In a seat construction for a vehicle comprising a horizontal seating platform and an upstanding back support, said back support having a top edge; the improvement which comprises (1) a shiftable, hand-actuable lever arm positioned proximate said seat member, (2) a pair of shoulder restraining arms in spaced relationship proximate said top edge, (3) a connector member connecting said shoulder restraining arms and (4) a second connector member connecting said just-mentioned connector (3) and said lever arm (1), said shoulder restraining arms (2) being conjointly shiftable from a lower position and an upper position responsive to movement of said lever arm (1), whereby, in said lower position, the shoulder restraining arms (2) restrain or inhibit forward movement of an occupant of said seat and, in said upper position, the said arms (2) allow forward movement of said occupant.

2. The improvement as defined in claim 1 which includes at least one arm support member (5) connected to said second-mentioned connector (4) and movable between a horizontal position and a retracted position whereby, in the horizontal position, it is convenient for resting the arm of an occupant situated in said seat and in said retracted position is not available for resting said arm.

3. The improvement as claimed in claim 1 wherein the shoulder restraining arms (2) include adjustable extension means for varying the length of the shoulder restraining arms to thereby permit accommodation and utilization with a wider variety of body configurations.

4. The improvement as claimed in claim 1 which includes a headrest projecting upwardly from said upper edge of said back support.

5. The improvement as claimed in claim 4 wherein said headrest is vertically adjustable.

6. The improvement as claimed in claim 1, wherein said lever arm (1) and said connector member (3) each include engagement means connected by said second connector member (4) to thereby translate movement of said lever arm (1) to said pair of shoulder restraining arms (2).

7. The improvement as claimed in claim 1, wherein said lever arm (1) and said connector member (3) each include an offset, eccentric or crank region and said regions are connected by said second connector member (4) to thereby translate movement of said lever arm (1) to said pair of shoulder restraining arms (2).

8. The improvement as claimed in claim 1, wherein said shoulder restraining arms extend from proximate said top edge of said back support forwardly, terminating in a downwardly extending leg which is spaced from said back support only a distance accommodating the thickness of the shoulders of the occupant.

* * * * *